(12) United States Patent
Sakala et al.

(10) Patent No.: US 11,015,461 B2
(45) Date of Patent: May 25, 2021

(54) COMPOSITE HOLLOW BLADE AND A METHOD OF FORMING THE COMPOSITE HOLLOW BLADE

(71) Applicant: GENERAL ELECTRIC COMPANY, Schenectady, NY (US)

(72) Inventors: Viswanadha Gupta Sakala, Bangalore (IN); Douglas Duane Ward, West Chester, OH (US); Ming Xie, Beavercreek, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 292 days.

(21) Appl. No.: 15/850,842

(22) Filed: Dec. 21, 2017

(65) Prior Publication Data

US 2019/0195073 A1 Jun. 27, 2019

(51) Int. Cl.
*F01D 5/28* (2006.01)
*F01D 5/14* (2006.01)
*B29C 70/38* (2006.01)
*B29C 70/70* (2006.01)
*B29C 70/34* (2006.01)
*B29D 99/00* (2010.01)
*B29L 31/08* (2006.01)

(52) U.S. Cl.
CPC ............ *F01D 5/282* (2013.01); *B29C 70/345* (2013.01); *B29C 70/38* (2013.01); *B29C 70/70* (2013.01); *B29D 99/0028* (2013.01); *F01D 5/147* (2013.01); *B29L 2031/08* (2013.01); *F05D 2240/301* (2013.01); *F05D 2250/28* (2013.01); *F05D 2250/291* (2013.01); *F05D 2300/603* (2013.01)

(58) Field of Classification Search
None
See application file for complete search history.

(56) References Cited

U.S. PATENT DOCUMENTS

| | | |
|---|---|---|
| 2,921,769 A | 6/1953 | Flader |
| 3,903,578 A | 9/1975 | Rothman |
| 5,141,400 A | 8/1992 | Murphy et al. |

(Continued)

FOREIGN PATENT DOCUMENTS

| | | |
|---|---|---|
| GB | 2315723 A | 2/1998 |
| WO | WO03093101 A1 | 11/2003 |

(Continued)

OTHER PUBLICATIONS

Office Action Corresponding to GB Application No. 1820401.6 dated Jun. 14, 2019.

*Primary Examiner* — Juan G Flores
(74) *Attorney, Agent, or Firm* — Dority & Manning, P.A.

(57) ABSTRACT

Composite hollow blade and an associated method of forming the composite hollow blade are disclosed. The method includes forming a core by fabricating a grid core structure based on a plurality of design parameters, where the grid core includes a plurality of first reinforcing components disposed in a first curable matrix material. The method further includes forming an outer layer including a plurality of second reinforcing components disposed in a second curable matrix material. Further, the method includes coupling the core to the outer layer and curing the core and the outer layer to form the composite hollow blade.

20 Claims, 6 Drawing Sheets

(56) References Cited

U.S. PATENT DOCUMENTS

| | | |
|---|---|---|
| 5,240,376 A | 8/1993 | Velicki |
| 6,007,894 A | 12/1999 | Barnes et al. |
| 6,431,837 B1 | 8/2002 | Velicki |
| 6,607,358 B2 | 8/2003 | Finn et al. |
| 7,128,536 B2 | 10/2006 | Williams et al. |
| 7,144,222 B2 | 12/2006 | Lanni et al. |
| 7,897,239 B2 | 3/2011 | Koon et al. |
| 7,993,105 B2 | 8/2011 | Weisse et al. |
| 9,387,533 B1 | 7/2016 | Heneveld et al. |
| 9,555,470 B1 | 1/2017 | Heneveld et al. |
| 9,579,714 B1 | 2/2017 | Rutkowski |
| 9,845,688 B2 | 12/2017 | Thomas et al. |
| 2011/0211965 A1 | 9/2011 | Deal et al. |
| 2013/0111907 A1 | 5/2013 | Murdock |
| 2015/0345396 A1 | 12/2015 | Zelesky et al. |
| 2016/0076552 A1 * | 3/2016 | Anderson ............. B29C 70/382 416/230 |
| 2016/0237828 A1 | 8/2016 | Burd |
| 2016/0332266 A1 | 11/2016 | Xu |
| 2018/0312239 A1 * | 11/2018 | Velez De Mendiz Bal Alonso ................... F01D 21/14 |

FOREIGN PATENT DOCUMENTS

| | | |
|---|---|---|
| WO | WO2009/058500 A1 | 5/2009 |
| WO | WO2014/143339 A1 | 9/2014 |
| WO | WO2016/174358 A1 | 11/2016 |

* cited by examiner

COMPOSITE HOLLOW BLADE AND A
METHOD OF FORMING THE COMPOSITE
HOLLOW BLADE

BACKGROUND

The present disclosure relates to a turbomachine, and more particularly to a method of forming a composite hollow blade for the turbomachine.

Turbomachine, such as a gas turbine engines, and more particularly turbofan engines used in aircraft, have a fan with a hub and a plurality of fan blades disposed on the hub for rotation about a centerline axis of the turbofan engine. During certain unforeseen events, such as at least one of a foreign object impact, a fan blade out, or a frequency/aeromechanics impact, some of the plurality of fan blades may get broken. Composites may be used in the fan blades, which may provide desired stiffness to the fan blades to prevent the fan blades from getting broken during the unforeseen events. However, manufacturing the fan blades with composites may require manual processing/intervention and may be a cumbersome process. Further, the fan blades manufactured using composites are generally solid in nature, thereby adding unnecessary weight to the aircraft, and increasing the operational and manufacturing cost of such fan blades. Accordingly, there is a need for an improved method of manufacturing a composite fan blade.

BRIEF DESCRIPTION

In accordance with one aspect of the present description, a method of forming a composite hollow blade is disclosed. The method includes a step of forming a core by fabricating a grid core structure based on a plurality of design parameters, where the grid core includes a plurality of first reinforcing components disposed in a first curable matrix material. The method further includes a step of forming an outer layer including a plurality of second reinforcing components disposed in a second curable matrix material. Further, the method includes a step of coupling the core to the outer layer, and a step of curing the core and the outer layer to form the composite hollow blade.

In accordance with another aspect of the present description, a method of forming a composite hollow blade is disclosed. The method includes a step of forming a core by wrapping or laying a plurality of first reinforcing components disposed in a first curable matrix material at one or more predefined locations on a first mold, based on one or more design parameters, to fabricate a grid core structure of the core. The one or more design parameters includes at least one of a width of the first reinforcing component of the plurality of reinforcing components, spacing between mutually adjacent reinforcing components of the plurality of first reinforcing components, and an orientation of a first reinforcing component of the plurality of reinforcing components. The method further includes a step of forming an outer layer. The step of forming the outer layer includes stacking a plurality of second reinforcing components disposed in a second curable matrix material on a second mold to define a pressure side of the composite hollow blade. The step of forming the outer layer further includes stacking the plurality of second reinforcing components disposed in the second curable matrix material on a third mold to define a suction side of the composite hollow blade. The method further includes a step of coupling the core to the outer layer, and a step of curing the core and the outer layer to form the composite hollow blade.

In accordance with yet another aspect of the present description, a composite hollow blade is disclosed. The composite hollow blade includes a core including a composite grid core structure, where the composite grid core structure includes a plurality of first reinforcing components and a first curable matrix material. The plurality of first reinforcing components is disposed at one or more predefined locations along the core based on a plurality of design parameters. The composite hollow blade further includes an outer layer including a plurality of second reinforcing components and a second curable matrix material, where the core is coupled to the outer layer. The plurality of design parameters includes at least one of a width of a first reinforcing component of the plurality of first reinforcing components, spacing between mutually adjacent reinforcing components of the plurality of first reinforcing components, and an orientation of a first reinforcing component of the plurality of reinforcing components defined by an angle with respect to a longitudinal axis of the composite hollow blade.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

To more clearly and concisely describe and point out the subject matter, the following definitions are provided for specific terms, which are used throughout the following description and the appended claims, unless specifically denoted otherwise with respect to a particular embodiment. The term "longitudinal axis" as used herein refers to an imaginary line positioned at a mid-portion of a turbofan engine. As used herein, the terms "axial" or "axially" refer to a dimension along the longitudinal axis of the turbofan engine. As used herein, the terms "radial" or "radially" refer to a dimension extending between the longitudinal axis of the turbofan engine and an outer circumference of the turbofan engine. Similarly, the term "blade" as used herein refers to a component of a turbomachine, whose shape and orientation may control one or more of stability, direction, lift, thrust, or propulsion to the turbofan engine. Non-limiting examples of suitable blades may include turbine blades (for example, aircraft engine blade, gas turbine blade, or wind turbine blade), compressor blades, fan blades, aircraft wings, and the like. In some examples, the blade may be an airfoil of a gas turbine or an aircraft engine. In other examples, the blade is the turbofan aircraft engine fan blade. The term "composite hollow blade" as used herein refers to a blade including a composite material and having a non-solid geometry, that is, at least a percentage of volume of the blade is unoccupied. The term "curable matrix material" as used herein refers to a material including one or more functional groups capable of reacting with each other when subjected to cure conditions. Further, the term curable matrix material as used herein includes uncured matrix material, that is, none of the functional groups have reacted with each other, or, a partially cured matrix material, that is a percentage of the functional groups have reacted with other. In some embodiments, the curable matrix material is present in the grid core structure or the layer as a partially cured material. In certain embodiments, the curable matrix material may be present as a 50%-80% partially cured material. In certain embodiments, the curable matrix material may be present as about 70% partially cured material. The term "grid core" as used herein refers to a core structure of a blade having a grid-like geometry. The term "reinforcing component" may include a single fiber, a filament, a thread, a woven fabric, a non-woven fabric, a braided fiber, a plurality of fibers, filaments, or threads. Further, the term "fiber" may include untwisted or twisted fibers, filaments, or threads. The term "fiber" also includes a strand, a tow, or a yarn. The term "frequency" as used herein refers to natural frequencies of component or different modes. The term "foreign object damage" as used herein refers to damage occurred due to impact of bird, ice, or hail stone. The term "fan blade out" as used herein refers to separation of a rotating fan blade from its supporting disk.

In some embodiments, a method of forming a composite hollow blade is presented. The method includes a step of forming a core by fabricating a grid core structure based on a plurality of design parameters, where the grid core includes a plurality of first reinforcing components disposed in a first curable matrix material. The method further includes a step of forming an outer layer including a plurality of second reinforcing components disposed in a second curable matrix material. Further, the method includes a step of coupling the core to the outer layer. The method further includes a step of curing the core and the outer layer to form the composite hollow blade.

Figure 1:
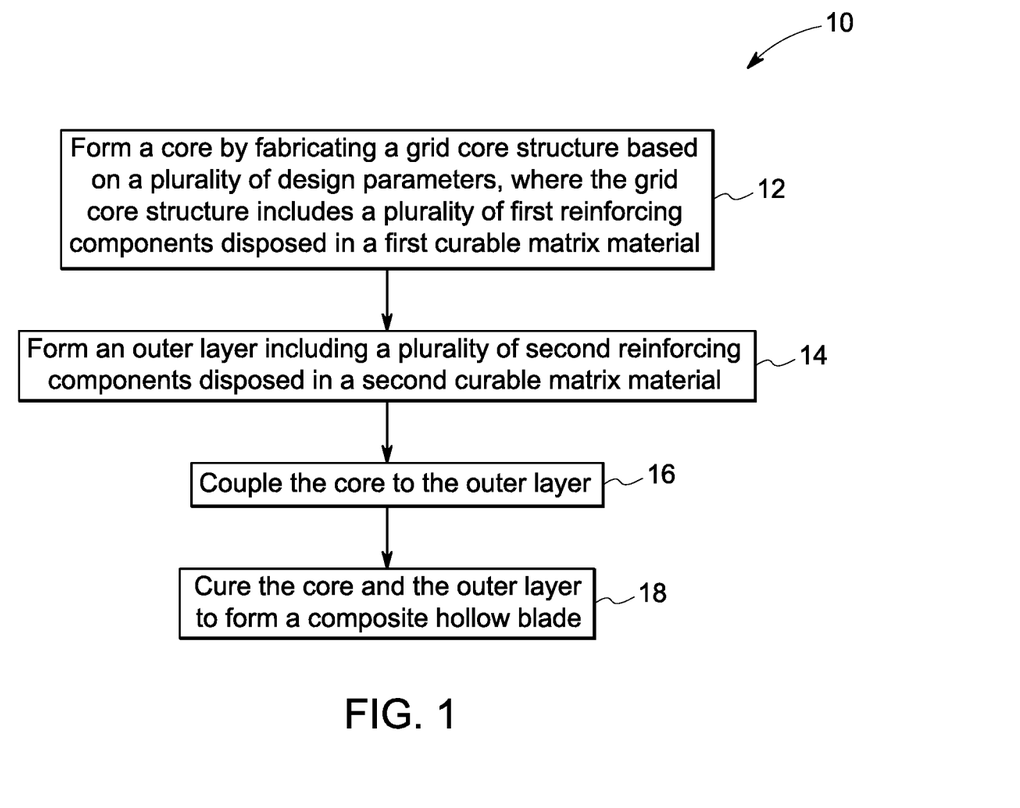
FIG. 1 is a flow chart illustrating a method of forming a composite hollow blade, in accordance with one embodiment of the description.

FIG. 1 is a flow chart illustrating a method 10 of forming a composite hollow blade 100 (as shown in at least FIGS. 3, 4A, and 7A), according to one embodiment of the description. The method 10 includes a step 12 of forming a core by fabricating a grid core structure based on a plurality of design parameters. In one embodiment, the grid core includes a plurality of first reinforcing components disposed in a first curable matrix material.

The first curable matrix material includes a thermoset, for example, an epoxy. In some embodiments, at least one of the first reinforcing components has a continuous fiber. In some other embodiments, the first reinforcing components has discrete fibers. In some embodiments, the plurality of first reinforcing components includes one or both of a carbon fiber and an s-glass fiber.

In some embodiments, the plurality of first reinforcing materials may be impregnated with the first curable matrix material, before the step of fabricating the grid core structure. In certain embodiments, the plurality of first reinforcing components is substantially impregnated with the first curable material. The term "substantially impregnated" as used herein means that greater than 50 volume percent of the plurality of first reinforcing components is in contact with the first curable matrix material.

Figure 4A:
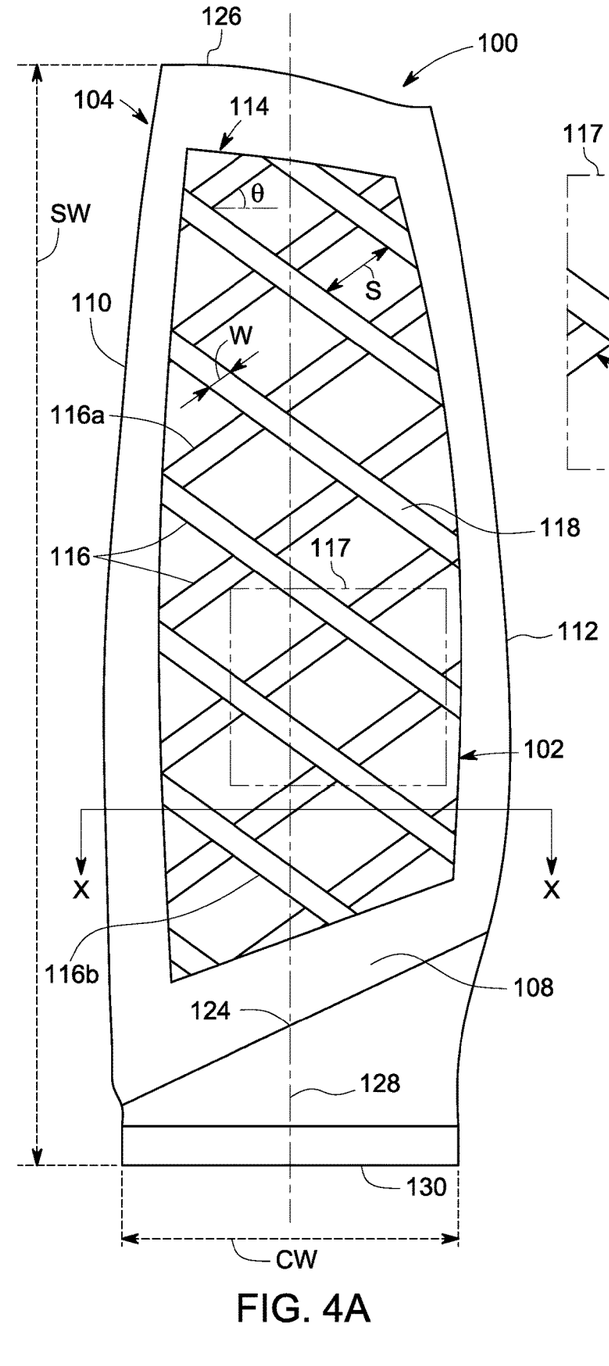
FIG. 4A is a schematic block diagram of a composite hollow blade, in accordance with an embodiment of the description.
Figure 4B:
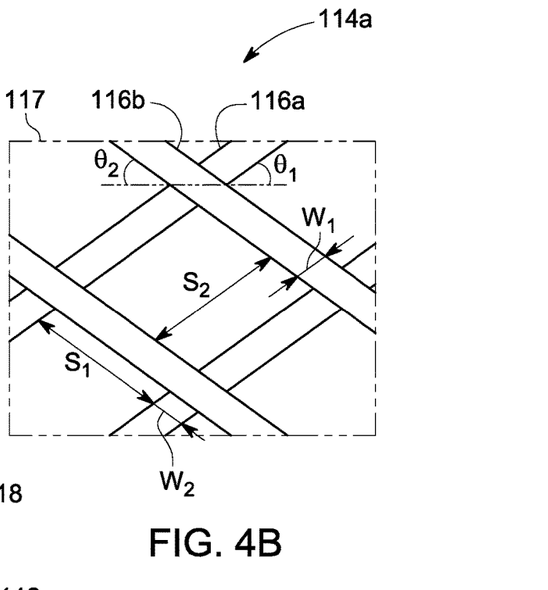
FIG. 4B is an expanded view of a portion of a core of the composite hollow blade of FIG. 4A, in accordance with an embodiment of the description.
Figure 5:
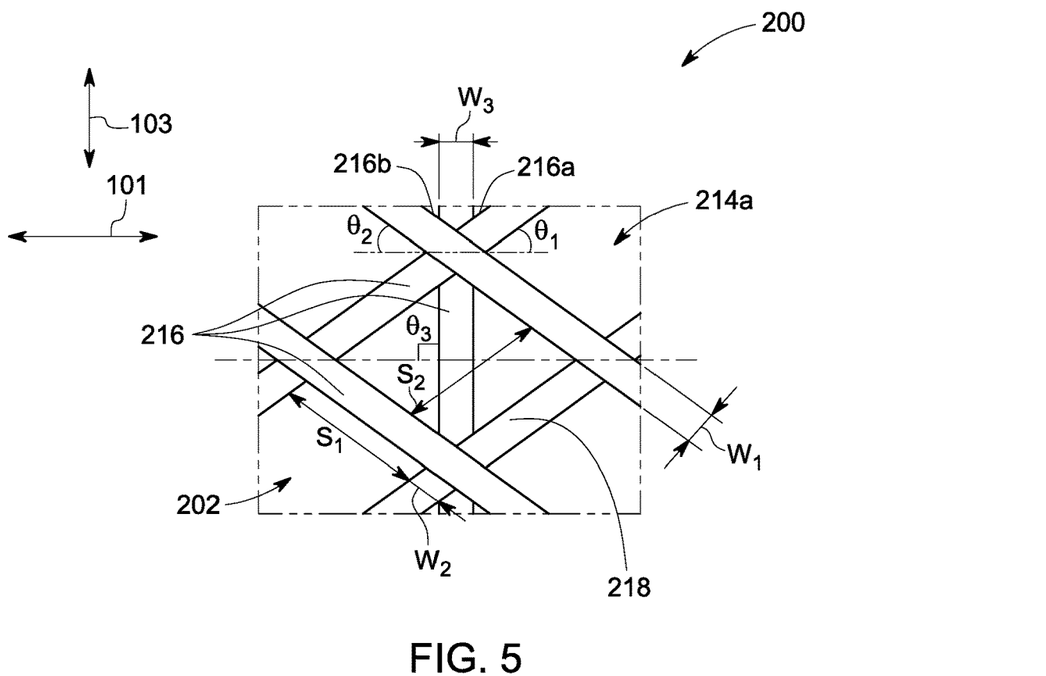
FIG. 5 is an expanded view of a portion of a core of a composite hollow blade, in accordance with another embodiment of the description.
Figure 6:
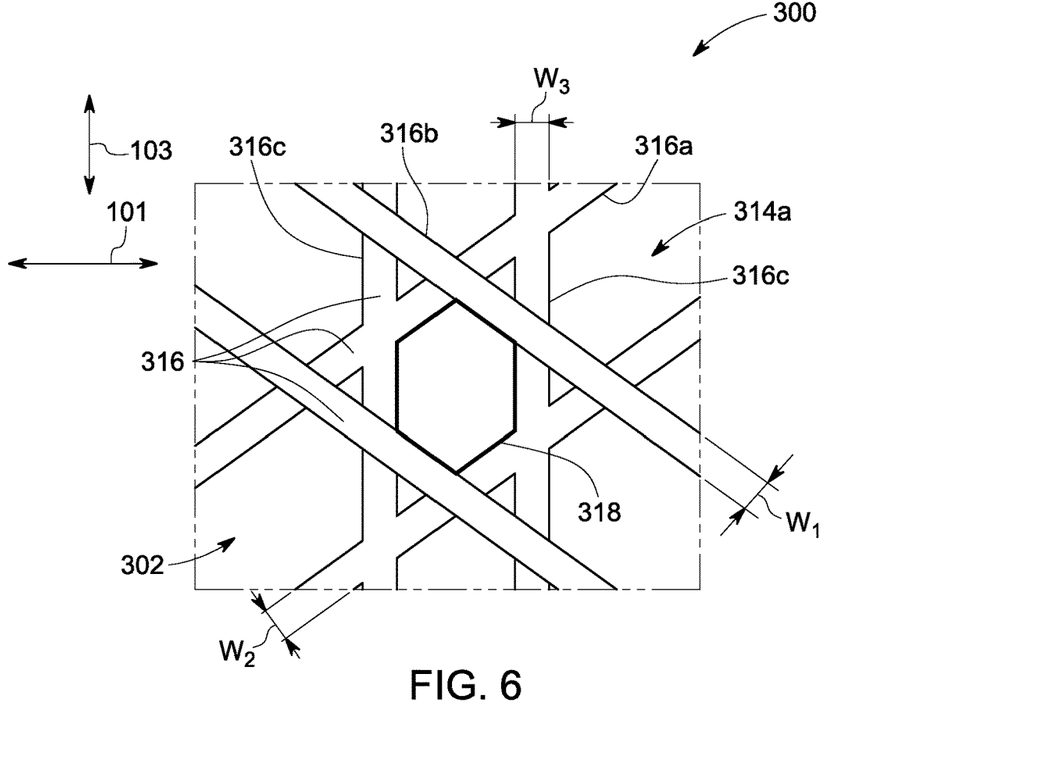
FIG. 6 is an expanded view of a portion of a core of a composite hollow blade, in accordance with yet another embodiment of the description.

In some embodiments, the step of fabricating the grid core structure includes wrapping or laying the plurality of first reinforcing components on a first mold (or mandrel) to form the grid core structure. Non-limiting examples of a suitable grid core structure include a bi-grid core structure, a tri-grid core structure, or a hexagonal-grid core structure (as shown in FIGS. 4B, 5, and 6 respectively.) In such example embodiments, the plurality of first reinforcing components is disposed at one or more predefined locations on the first mold by using one or more of an automated fiber placement technique, an automated tape placement technique, or a braided technique. In one or more embodiments, the one or more predefined locations in mold as discussed herein, are the locations in the composite hollow blade which may be susceptible to the frequency impact, the foreign object damage, and the fan blade out damage during operation of the aircraft. In some embodiments, the one or more predefined locations includes at least one of a span-wise location from a hub to a tip of the composite hollow blade along the leading edge, a chord-wise location along the hub at the trailing edge of the composite hollow blade, a mid-plane location of the composite hollow blade, and a root location of the composite hollow blade (as shown in FIG. 4A).

Figure 7A:
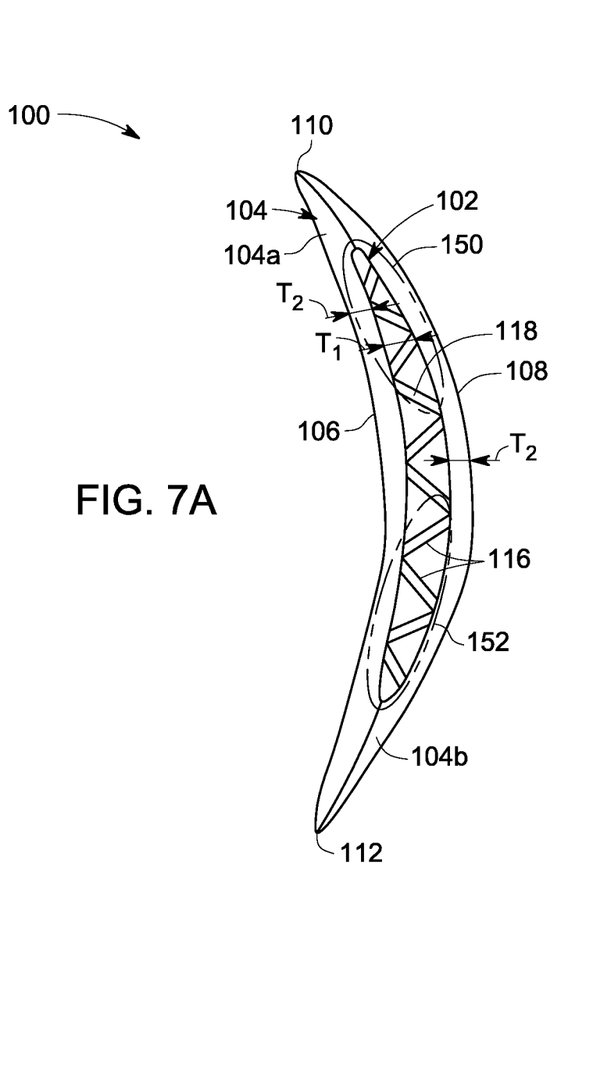
FIG. 7A is a sectional view of the composite hollow blade taken along line X-X in FIG. 4A, in accordance with an embodiment of the description.

In some embodiments, the plurality of first reinforcing components disposed in the first curable matrix material is wrapped or laid on the first mold such that the grid core structure has a non-uniform thickness from a pressure side to a suction side of the composite hollow blade (as shown in FIG. 7A).

As mentioned earlier, the step 12 of forming the core includes selecting the plurality of design parameters such that the grid core structure provides sufficient stiffness to the composite hollow blade to sustain one of a frequency requirement, a foreign object damage requirement of the composite hollow blade, or a fan blade out requirement, during operation of a turbofan engine in an aircraft. In some embodiments, the plurality of design parameters may include at least one of a width of a reinforcing component of the plurality of reinforcing components, spacing between mutually adjacent reinforcing components of the plurality of first reinforcing components, and an orientation of a first reinforcing component of the plurality of first reinforcing components defined by an angle with respect to a longitudinal axis of the composite hollow blade (as shown in FIGS. 4B, 5, and 6).

In one embodiment, the width of the first reinforcing component is in a range from about 0.25 inches to about 1.5 inches. In another embodiment, the width is in a range from about 0.3 inches to about 0.1 inches. In yet another embodiment, the width is a range from about 0.25 inches to about 1 inches. In one embodiment, the spacing between mutually adjacent first reinforcing components is in a range from about 0.5 inches to about 2 inches. In another embodiment, the spacing is in a range from about 0.75 inches to about 1.5 inches. In yet another embodiment, the spacing is a range from about 0.5 inches to about 1.5 inches. In one embodiment, the angle is in a range from 15 degrees to 150 degrees. In another embodiment, the angle is in a range from about 30 degrees to about 120 degrees. In yet another embodiment, the angle is a range from about 15 degrees to about 60 degrees.

In some embodiments, the grid core structure is fabricated by varying at least one of the plurality of design parameters. In some other embodiments, the grid core structure is fabricated by varying each of the plurality of design parameters. For example, in one embodiment, the grid core structure is fabricated by varying the spacing between mutually adjacent first reinforcing components and orientation of the first reinforcing component, from a leading edge of the composite hollow blade to a trailing edge of the composite hollow blade (as shown in FIG. 4A). In such example embodiment, the width of the plurality of first reinforcing components may be held constant depending on the application and design criteria. In some embodiments, the composite grid core structure having the plurality of first reinforcing components arranged (or concentrated) at the one or more predefined location as discussed herein, based on the plurality of design parameters may provide sufficient stiffness to the composite hollow blade at those predefined locations, to handle one of the frequency requirement, the foreign object damage requirement, or the fan blade out requirement.

With continued reference to FIG. 1, the method 10 further includes a step 14 of forming an outer layer including a plurality of second reinforcing components disposed in a second curable matrix material. The outer layer is fabricated to provide the airfoil shape/structure to the composite hollow blade. Further, the outer layer may add structural stiffness and higher strain capability to the composite hollow blade. The term "outer layer" as used herein refers to a single ply, a plurality of plies, a single prepreg layer, a plurality of prepreg layers, or combinations thereof. In some embodiments, the outer layer may include a plurality of unidirectional (UD) prepreg layers. In such embodiments, the plurality of second reinforcing components include unidirectional fibers or tapes. In some other embodiments, the outer layer may include 2D woven structures or 2.5D woven structures, disposed in a second curable matrix material. In such embodiments, the plurality of second reinforcing components include 2D woven structures or 2.5D woven structures. In some embodiments, the plurality of second reinforcing components includes one or both of a carbon fiber and an s-glass fiber. The second curable matrix material includes a thermoset, for example, an epoxy.

In one embodiment, forming the outer layer includes a sub step (i) of stacking the plurality of second reinforcing components disposed in the second curable matrix material on a second mold (or mandrel) to define a pressure side of the composite hollow blade, and a sub step (ii) of stacking the plurality of second reinforcing components disposed in the second curable matrix on a third mold (or mandrel) to define a suction side of the composite hollow blade. In some embodiments, the plurality of second reinforcing components disposed in the second curable matrix is stacked on the second mold and the third mold such that the outer layer has a substantially uniform thickness on the pressure side and the suction side (as shown in FIG. 7A).

In the embodiment of FIG. 1, the steps 12 of forming the core and the step 14 of forming the outer layer are shown as a sequential process. Such an illustration should not be construed as a limitation of the present technique. In some other embodiments, the steps 12 and 14 may be performed simultaneously, as the process performed in the steps 12 and 14 are independent to one another. In other words, there are no interdependencies in the process performed in the steps 12 and 14.

Referring again to FIG. 1, the method 10 further includes a step 16 of coupling the core to the outer layer. In some embodiments, the step 16 of coupling the core to the outer layer includes a sub step (i) of disposing the second mold having the pressure side of the composite hollow blade on a portion of the first mold, and (ii) disposing the third mold having the suction side of the composite hollow blade on another portion of the first mold, such that the grid core structure formed in the first mold is substantially surrounded by the second and third mold. In some embodiments, the step 16 of coupling the core to the outer layer includes a sub step (iii) of attaching an interfacing section of the core with the outer layer by using one or both of a thermoplastic ply and an adhesive. In some other embodiments, the step 16 of coupling the core to the outer layer includes a sub step (iii) of attaching the interfacing section of the core with the outer layer by fiber stitching the core to the outer layer. In certain embodiments, the fiber stitching of the core to the outer layer may be a through thickness stitching. In some embodiments, the step 16 of coupling the core to the outer layer may further include attaching the pressure side and the suction side to each other at the leading edge and the trailing edge of the composite hollow blade. In one or more embodiments, the coupling of the core to the outer layer may improve the interface strength between the core and the outer layer of the composite hollow blade.

The method 10 further includes a step 18 of curing the core and the outer layer to form a composite hollow blade. In one embodiment, the core and the outer layer coupled to each other are thermal cured using an autoclave machine to form a composite hollow blade. In some embodiments, the first curable matrix material and the second curable matrix material may be substantially cured during the steps 12 and 14 respectively. The term "substantially cured" as used herein means that greater than 90% cross-linking of the curable groups in the first curable matrix material or the second curable matrix material is achieved.

Figure 2:
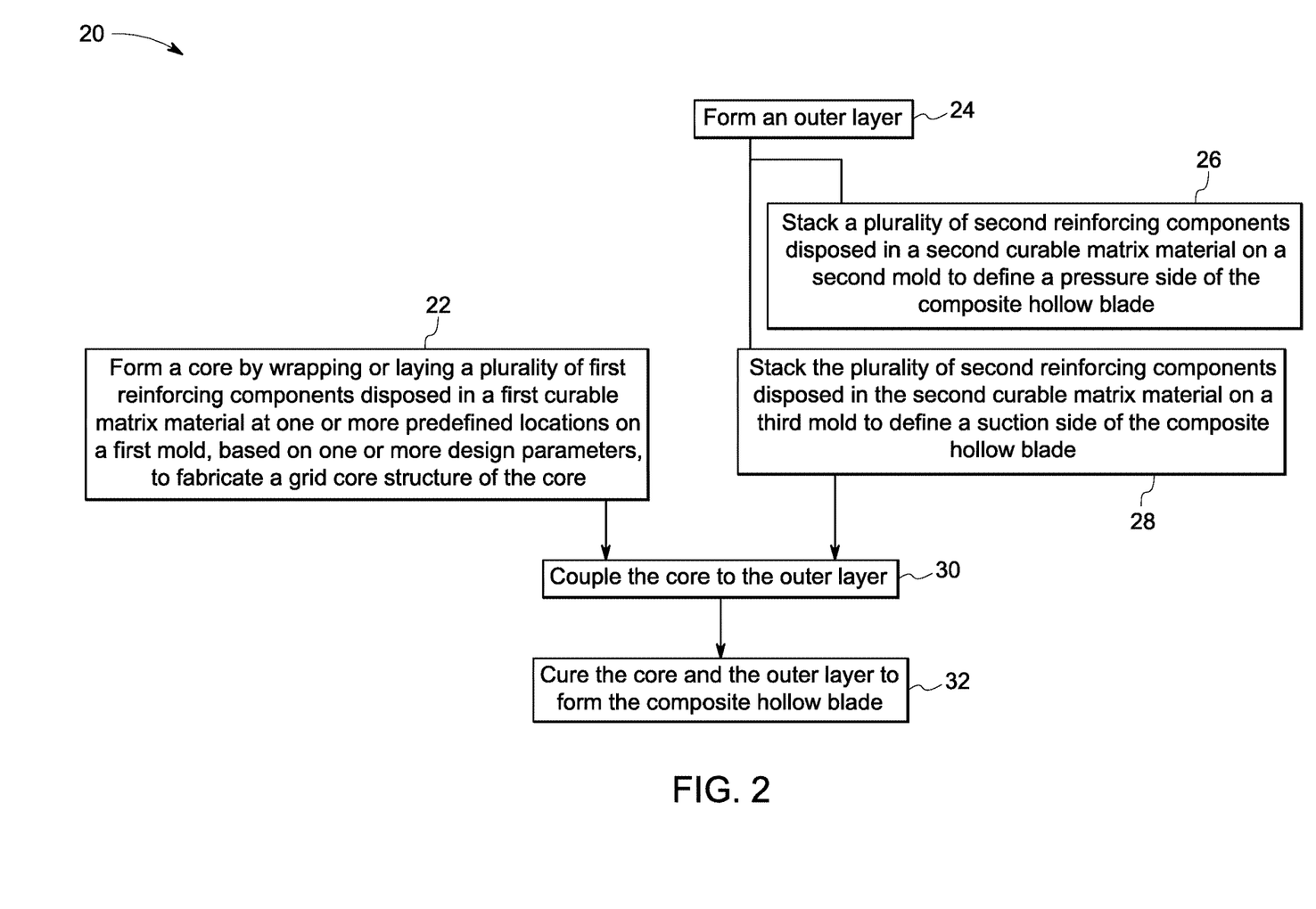
FIG. 2 is a flow chart illustrating a method of forming a composite hollow blade, in accordance with another embodiment of the description.

FIG. 2 is a flow chart illustrating a method 20 of forming a composite hollow blade, according to another embodiment of the description. The method 20 includes a step 22 of forming a core of the composite hollow blade and a step 24 of forming an outer layer of the composite hollow blade. In the embodiment of FIG. 2, the steps 22 of forming the core and the step 24 of forming the outer layer are shown as a simultaneously or parallel process. Such an illustration should not be construed as a limitation of the present technique. In some other embodiments, the steps 22 and 24 may be performed sequentially.

The step 22 of forming the core includes wrapping or laying a plurality of first reinforcing components disposed in a first curable matrix material at one or more predefined locations on a first mold, based on one or more design parameters. Similarly, the step 24 of forming the outer layer includes a sub-step 26 of stacking a plurality of second reinforcing components disposed in a second curable matrix material on a second mold to define a pressure side of the composite hollow blade. Further, the step 24 of forming the outer layer of the composite hollow blade includes another sub-step 28 of stacking the plurality of second reinforcing components disposed in a second curable matrix on a third mold to define a suction side of the composite hollow blade. The method 20 further includes a step 30 of coupling the core to the outer layer using at least one of a thermoplastic ply, an adhesive, and fiber stitching. The method 20 further includes a step 32 of curing the core and the outer layer to form a composite hollow blade using an autoclave machine.

In some embodiments, a composite hollow blade is presented. The composite hollow blade includes a core including a composite grid core structure, where the composite grid core structure includes a plurality of first reinforcing components and a first curable matrix material. The plurality of first reinforcing components is disposed at one or more predefined locations along the core based on a plurality of design parameters. The composite hollow blade further includes an outer layer including a plurality of second reinforcing components and a second curable matrix material, where the core is coupled to the outer layer. The plurality of design parameters includes at least one of a width of a reinforcing component of the plurality of first reinforcing components, spacing between mutually adjacent reinforcing components of the plurality of first reinforcing components, and an orientation of a first reinforcing component of the plurality of reinforcing components defined by an angle with respect to a longitudinal axis of the composite hollow blade.

Figure 3:
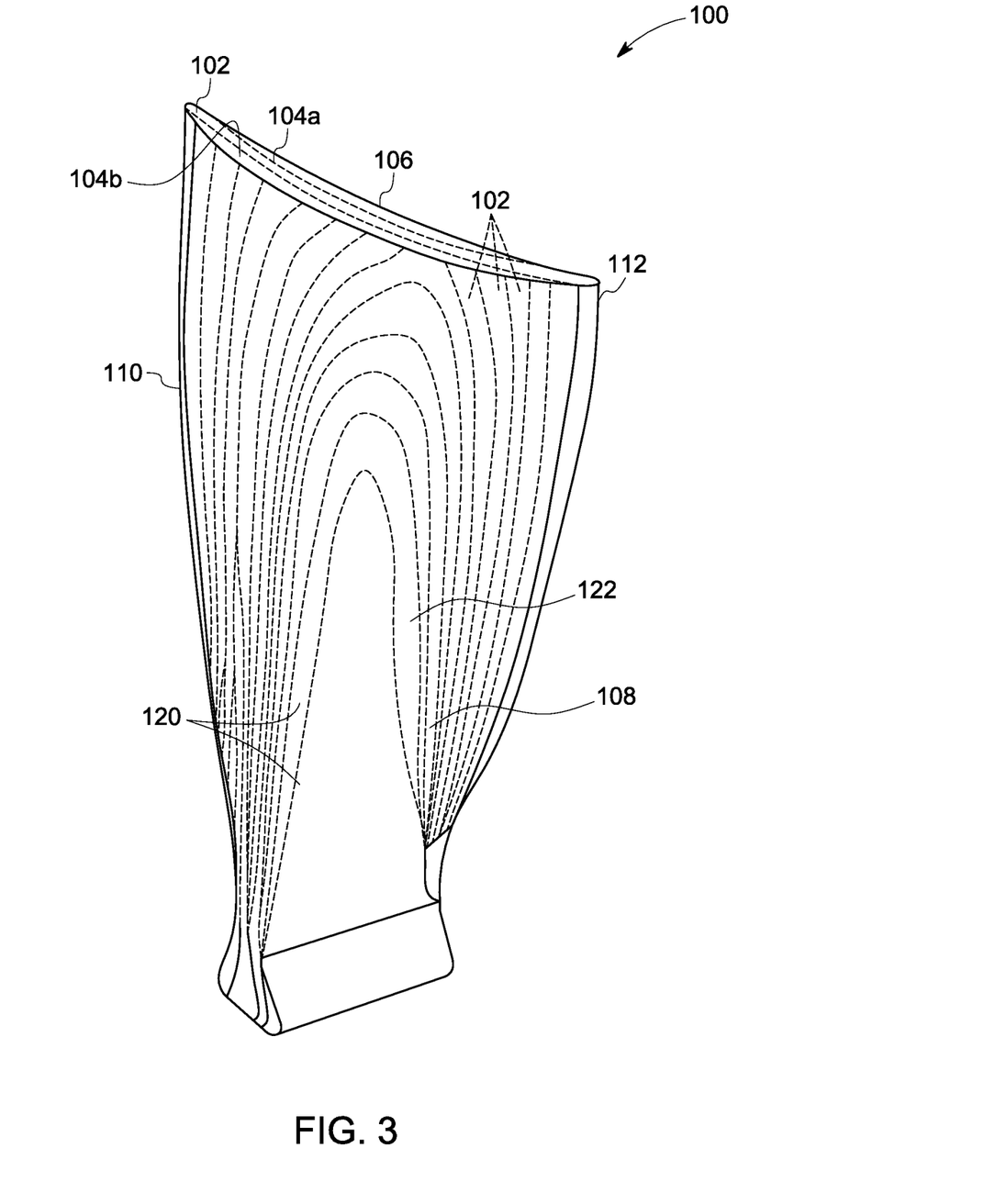
FIG. 3 is a perspective view of a composite hollow blade, according to an embodiment of the description.

FIG. 3 illustrates a perspective view of a composite hollow blade 100, according to one embodiment of the description. It should be noted herein that the composite hollow blade 100 may also be referred to as an "airfoil". In one embodiment, the composite hollow blade 100 is a fan blade of a turbofan engine used in an aircraft. Non-limiting examples of a suitable composite hollow blade 100 may include turbine blades (for example, aircraft engine blade, gas turbine blade, or wind turbine blade), compressor blades, aircraft wings, and the like.

In some embodiments, the composite hollow blade 100 has a core 102 and an outer layer 104. In one embodiment, the core 102 is disposed within the outer layer 104 and coupled to the outer layer 104. For ease of illustration, the core 102 is shown with a dotted line in FIG. 3 along a tip of the composite hollow blade 100 and such an illustration should not be construed as a limitation of the present description. The composite hollow blade 100 includes a pressure side 106, a suction side 108, a leading edge 110, and a trailing edge 112.

The core 102 includes a composite grid core structure 114 (as shown in FIG. 4A). In some embodiments, the composite grid core structure 114 includes a plurality of first reinforcing components 116 and a first curable matrix material 118 (as shown in FIG. 4A). In such example embodiments, the plurality of first reinforcing components 116 is disposed at one or more predefined locations along the core 102 based on a plurality of design parameters. In some embodiments, the plurality of first reinforcing components 116 includes one or both of a carbon fiber or an s-glass and the first curable matrix material 118 includes a thermoset, for example, an epoxy. The core 102 is discussed in greater details below.

The outer layer 104 is disposed over the core 102 to provide the airfoil shape/structure to the composite hollow blade 100. In the illustrated embodiment of FIG. 3, the outer layer 104 includes a pressure side portion 104a and a suction side portion 104b, coupled to each other at the leading edge 110 and the trailing edge 112. The outer layer 104 may add structural stiffness and higher strain capability to the composite hollow blade 100. The outer layer 104 includes a plurality of second reinforcing components 120 and a second curable matrix material 122. The term "outer layer" as used herein refers to a single ply, a plurality of plies, a single prepreg layer, a plurality of prepreg layers, or combinations thereof. In some embodiments, the outer layer 104 may include a plurality of unidirectional (UD) prepreg layers. In such embodiments, the plurality of second reinforcing components include unidirectional fibers or tapes. In some other embodiments, the outer layer 104 may include 2D woven structures or 2.5D woven structure. In one embodiment, the plurality of second reinforcing components 120 includes one or both of a carbon fiber and an s-glass fiber and the second curable matrix material 122 includes a thermoset, for example, an epoxy as described herein earlier. In some embodiments, the first curable matrix material 118 and the second curable matrix material 122 are different. In some other embodiments, the first curable matrix material 118 and the second curable matrix material 122 may be same.

FIG. 4A illustrates a schematic block diagram of the composite hollow blade 100, according to one embodiment of the description. The composite hollow blade 100 includes a core 102 and an outer layer 104, where the core 102 is coupled to the outer layer 104. FIG. 4B illustrates an expanded view of a portion 117 of the core 102 of the composite hollow blade 100, according to one embodiment of the description.

The core 102 includes a composite grid core structure 114, for example, a bi-grid core structure 114A. In certain embodiments, the composite grid core structure 114 includes a bi-grid core structure, for example, a bi-grid core braid, as shown in the embodiment of FIG. 4B. As used herein, the term "braid" refers an interlaced set of the plurality of first reinforcing components 116.

The composite grid core structure 114 further includes a first curable matrix material 118 such that the plurality of first reinforcing components 116 is substantially impregnated with the first curable matrix material 118. The term "substantially impregnated" as used herein means that greater than 50 volume percent of the plurality of first reinforcing components 116 is in contact with the first curable matrix material 118. The first curable matrix material 118 may be present in the composite grid core structure 114 in an amount corresponding to from about 10 weight percent to about 80 weight percent based upon a total weight of the composite grid core structure 114.

In some embodiments, the plurality of first reinforcing components 116 is disposed at one or more predefined locations along the core 102 based on a plurality of design parameters. In some embodiments, one of the plurality of design parameters includes at least one of a width "W" of the reinforcing component of the plurality of first reinforcing components 116. In one embodiment, the width "W" of the first reinforcing component 116 is in a range from about 0.25 inches to about 1.5 inches. In another embodiment, the width "W" is in a range from about 0.3 inches to about 0.75 inches. In yet another embodiment, the width "W" is a range from about 0.25 inches to about 1 inches. In some embodiments, one of the plurality of design parameters includes a spacing "S" between mutually adjacent reinforcing components of the plurality of first reinforcing components 116. In one embodiment, the spacing "S" between the mutually adjacent first reinforcing component 116 is in a range from about 0.5 inches to about 2 inches. In another embodiment, the spacing "S" is in a range from about 0.75 inches to about 1.5 inches. In yet another embodiment, the spacing "S" is a range from about 0.5 inches to about 1.5 inches. In some other embodiments, one of the plurality of design parameters includes an orientation of the reinforcing component of the plurality of first reinforcing component 116 defined by an angle "θ" with respect to a longitudinal axis of the composite hollow blade. In one embodiment, the angle "θ" is in a range from 15 degrees to 150 degrees. In another embodiment, the angle "θ" is in a range from about 30 degrees to about 120 degrees. In yet another embodiment, the angle "θ" is a range from about 15 degrees to about 60 degrees. In the illustrated embodiment of FIG. 4B, the plurality of first reinforcing components 116 includes a primary reinforcing component 116a and a secondary reinforcing component 116b, both being disposed in the first curable matrix material 118.

As shown in FIG. 4B, the primary reinforcing component 116a extends in a first direction at a first angle "$\theta_1$" relative to a longitudinal axis 101 and the secondary reinforcing component 116b extends in a second direction at a second angle "$\theta_2$" relative to the longitudinal axis 101. As described herein, the first angle "$\theta_1$" is the acute angle measured from the longitudinal axis 101. Similarly, the second angle "$\theta_2$" is the acute angle measured from the longitudinal axis 101. The first angle "$\theta_1$" may be in a range of from about 15 degrees to about 60 degrees. The second angle "$\theta_2$" may be in a range of from about 105 degrees to about 150 degrees. The primary reinforcing component 116a has a first width "$W_1$" and the secondary reinforcing component 116b has a second width "$W_2$". In one or more embodiments, the first width "$W_1$" and the second width "$W_2$" are substantially same. In some other embodiments, the first width "$W_1$" and the second width "$W_2$" may be different. In some embodiments, the first width "$W_1$" and the second width "$W_1$" of the primary reinforcing component 116a and the secondary reinforcing component 116b respectively are in a range from about 0.25 inches to about 1 inches. The mutually adjacent primary reinforcing component 116a are spaced apart from each other at a distance "$S_1$". Similarly, mutually adjacent secondary reinforcing component 116b are spaced apart from each other at a distance "$S_2$". In such example embodiments, each of the distance "$S_1$" and "$S_2$" is in a range from about 0.5 inches to about 2 inches.

Referring again to FIG. 4A, in some embodiments, the one or more predefined locations includes at least one of a span-wise location "SW" from a hub 124 to a tip 126 of the composite hollow blade 100 along the leading edge 110 of the composite hollow blade 100, a chord-wise location "CW" along the hub 124 at the trailing edge 112 of the composite hollow blade 100, a mid-plane location 128 of the composite hollow blade 100, and a root location 130 of the composite hollow blade 100.

In some embodiment, the span-wise location "SW" may be in a range from 20 percent to 80 percent of a length of the composite hollow blade 100 from the hub 124 to the tip 126 for grid core. The chord-wise location "CW" may be in a range from 20 percent to the 80 percent of a width of the composite hollow blade 100 from the trailing edge 112 along the hub 124 for grid core. In certain embodiments, the one or more predefined locations in the composite hollow blade 100 as discussed herein, are the locations which may be susceptible to the frequency impact, the foreign object damage, and the fan blade out damage during operation of the aircraft. The foreign object damage may include a bird impact or an ice impact. The composite grid core structure 114 having the plurality of first reinforcing components 116 disposed at the one or more predefined location as discussed herein, based on the plurality of design parameters may provide sufficient stiffness to the composite hollow blade 100 to handle one of the frequency requirement, the foreign object damage requirement, or the fan blade out requirement.

The outer layer 104 includes a plurality of second reinforcing components 120 and a second curable matrix material 122, as shown in the embodiment of FIG. 3. It should be noted herein that the plurality of second reinforcing components 120 and the second curable matrix material 122 are not shown in the embodiment of FIG. 4A for ease of illustration and such an illustration should not be construed as a limitation of the present description. In some embodiments, the core 102 and the outer layer 104 are coupled to each other using at least one of a thermoplastic ply and an adhesive. In some other embodiments, the core 102 and the outer layer 104 are coupled to each other using fiber stitching.

FIG. 5 illustrates an expanded view of a portion of a core 202 of a composite hollow blade 200, according to another embodiment of the description. In the illustrated embodiment, the core 202 includes a composite grid core structure such as a tri-grid core structure 214A. The tri-grid core structure 214A includes a plurality of first reinforcing components 216 and a first curable matrix material 218. In the illustrated embodiment, the plurality of first reinforcing components 216 includes a primary reinforcing component 216a, a secondary reinforcing component 216b, and a tertiary reinforcing component 216c, where each one of them are disposed in the first curable matrix material 218. The primary and secondary reinforcing components 216a, 216b are similar to the primary and secondary reinforcing components 116a, 116b discussed in the embodiment of FIG. 4B. The tertiary reinforcing component 216c extends along a radial axis 103 of the composite hollow blade 200. Specifically, the tertiary reinforcing component 216c extends along an intersection region 240 of the primary and secondary reinforcing components 216a, 216b respectively. The tertiary reinforcing component 216c may be aligned with a span-wise direction of the composite hollow blade 200. The tertiary reinforcing components 216c are interwoven with the primary and secondary reinforcing components 216a, 216b, with the fibers of the primary and secondary reinforcing components 216a, 216b passing over and under fibers of the tertiary reinforcing component 216c. The tri-grid core structure 214 may be braided in a style known as diamond braid in which the fibers are braided in an over one and under one configuration.

As described hereinabove, the tertiary reinforcing component 216c extends in a third direction at a third angle "$\theta_3$" relative to the longitudinal axis 101. The third angle "$\theta_3$" is about 90 degrees. The tertiary reinforcing component 216c has a width "$W_3$". In some embodiments, the third width "$W_3$" is in a range from about 0.25 inches to about 1 inches. Further, mutually adjacent tertiary reinforcing component 216c may be spaced apart from each other at a distance. In such example embodiments, the distance is in a range from about 0.5 inches to about 2 inches.

FIG. 6 illustrates an expanded view of a portion of a core 302 of a composite hollow blade 300, according to another embodiment of the description. In the illustrated embodiment, the core 302 includes a hexagonal-grid core structure 314A. The hexagonal-grid core structure 314A includes a plurality of first reinforcing components 316 and a first curable matrix material 318. In the illustrated embodiment, the plurality of first reinforcing components 316 includes a primary reinforcing component 316a, a secondary reinforcing component 316b, and a tertiary reinforcing component 316c, where each one of them are disposed in the first curable matrix material 318. The primary and secondary reinforcing components 316a, 316b are similar to the primary and secondary reinforcing components 116a, 116b discussed in the embodiment of FIG. 4B. The tertiary reinforcing components 316c extend along a radial axis 103 of the composite hollow blade 300. Specifically, the tertiary reinforcing component 316c extends substantially at a mid-region (not labeled) of the primary and secondary reinforcing components 316a, 316b respectively to define the hexagonal-grid core structure 314A to a composite grid core structure. The tertiary reinforcing components 316c may be aligned with a span-wise direction of the composite hollow blade 300. The tertiary reinforcing components 316c are interwoven with the primary and secondary reinforcing components 316a, 316b with fibers of the primary and secondary reinforcing components 316a, 316b passing over and under fibers of the tertiary reinforcing component 316c.

The bi-grid core structure 114a, the tri-grid core structure 214a, or a hexagonal-grid core structure 314a allows the composite hollow blade 100, 200, 300 respectively to have a hollow core structure, thereby reducing an overall weight of the turbofan engine and resulting in reduction of manufacturing cost and improving aerodynamic performance of the blade design.

As discussed herein with respect to embodiments of FIGS. 5 and 6, the tri-grid core structure 214a or the hexagonal-grid core structure 314a having the plurality of first reinforcing components 216, 316 respectively disposed at one or more predefined locations along the core 202, 302 respectively based on a plurality of design parameters may provide sufficient stiffness to the composite hollow blade 200, 300 respectively to handle one of the frequency requirement, the foreign object damage requirement, or the fan blade out requirement.

Figures 7B, 7C:
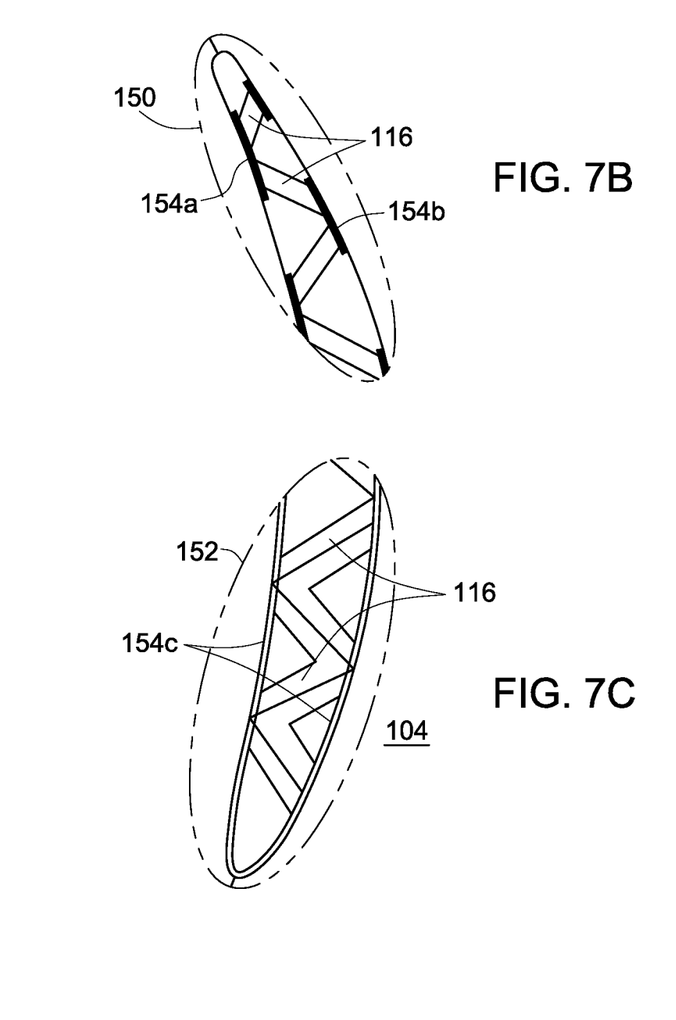
FIG. 7B is an expanded view of a portion of a composite hollow blade, in accordance with an embodiment of the description.
FIG. 7C is an expanded view of another portion of a composite hollow blade, in accordance with an embodiment of the description.

FIG. 7A illustrates a sectional view of the composite hollow blade 100 taken along the line X-X in FIG. 4A, according to an embodiment of the description. FIG. 7B is an expanded view of a portion 150 of the composite hollow blade 100, according to the embodiment of the description. FIG. 7C is an expanded view of another portion 152 of the composite hollow blade 100, according to the embodiment of the description.

In the illustrated embodiment, the composite hollow blade 100 has a core 102 and an outer layer 104. The core 102 is disposed at a center region of the composite hollow blade 100 and the outer layer 104 is disposed surrounding the core 102. The term "surrounding" as used herein means that up to 100 percent surface area of the core 102 is surrounded by the outer layer 104. In the illustrated embodiment, the core 102 includes a composite grid core structure 114 including a plurality of first reinforcing components 116 and a first curable matrix material 118. In one embodiment, the core 102 has a non-uniform thickness "$T_1$" from a pressure side 106 to a suction side 108 of the composite hollow blade 100. The outer layer 104 has a substantially uniform thickness "$T_2$" on the pressure side 106 and the suction side 108. In the illustrated embodiment, the outer layer 104 includes a pressure side portion 104a and a suction side portion 104b coupled to each other at the leading edge 110 and the trailing edge 112. The outer layer 104 includes a plurality of second reinforcing components 120 and the second curable matrix material 122 (as shown in FIG. 3). It should be noted herein that the plurality of second reinforcing components 120 and the second curable matrix material 122 are not shown in the embodiment of FIG. 4A for ease of illustration and such an illustration should not be construed as a limitation of the present description. The core 102 is coupled to the outer layer 104 to form the composite hollow blade 100. In the embodiment of FIG. 7B, a portion of core 102 is coupled to a portion of the outer layer 104 using one or both of a thermoplastic ply 154a and an adhesive 154b. Similarly, in the embodiment of FIG. 7C, another portion of the core 102 is coupled to another portion of the outer layer 104 using a fiber stitching 154c. It should be noted herein, in some other embodiments, the whole of the core 102 may be coupled to whole of the outer layer 104 using any one of the thermoplastic ply 154a, the adhesive 154b, and the fiber stitching 154c. In certain embodiments, the fiber stitching of the core 102 to the outer layer 104 may be a through thickness stitching. The coupling techniques discussed herein is configured to improve the interface strength between the core 102 and the outer layer 104.

In accordance with one or more embodiments, a composite core of the present description may provide desired stiffness to the composite hollow blade to handle one of a frequency requirement, a foreign object damage (FoD) requirement of the composite hollow blade, or a fan blade out (FBO) requirement, thereby improving performance of a turbofan engine. Specifically, the composite hollow blade having a composite grid core structure with a variable width of the reinforcing component, spacing between the reinforcing component, and orientation of the reinforcing components may meet the frequency, the FoD, the FBO, and normal operating requirement of the turbofan aircraft. Further, the composite grid core may provide frangibility for composite hollow blade during FBO event, which in turn reduces overall engine unbalance. The composite hollow blade of the present description may be relatively easier to manufacture, due to the automation of the manufacturing process through usage of at least one of an automated fiber placement technique, an automated tape placement technique, or a braided technique, which reduces the overall cycle time and cost of manufacturing of the fan blade. Further, due to a hollow blade design an overall weight of the turbofan engine may be reduced, thus resulting in reduction of manufacturing cost and improving aerodynamic performance of the blade.

While only certain features of embodiments have been illustrated, and described herein, many modifications and changes will occur to those skilled in the art. It is, therefore, to be understood that the appended claims are intended to cover all such modifications and changes as falling within the spirit of the invention.

The invention claimed is:

1. A method comprising:
forming a core by fabricating a grid core structure based on a design parameter, wherein the grid core structure comprises a plurality of first reinforcing components disposed in a first curable matrix material;
forming an outer layer comprising a plurality of second reinforcing components disposed in a second curable matrix material;
coupling the core to the outer layer; and
curing the core and the outer layer to form a composite hollow blade;
wherein the design parameter is a width of one of the reinforcing components of the plurality of first reinforcing components or a spacing between mutually adjacent reinforcing components of the plurality of first reinforcing components; and
wherein the width of the first reinforcing components of the plurality of first reinforcing components is in a range from about 0.25 inch to about 1 inch, the spacing between mutually adjacent first reinforcing components is in a range from about 0.5 inch to about 2 inches, or both.

2. The method of claim 1, wherein the design parameter additionally includes an orientation of one of the reinforcing components of the plurality of first reinforcing components defined by an angle with respect to a longitudinal axis of the composite hollow blade.

3. The method of claim 2, wherein the angle is in a range from about 15 degrees to about 150 degrees.

4. The method of claim 1, wherein forming the core comprises selecting the plurality of design parameters such that the grid core structure sustains one of a frequency requirement, a foreign object damage requirement of the composite hollow blade, or a fan blade out requirement.

5. The method of claim 1, wherein fabricating the grid core structure comprises:
wrapping or laying the plurality of first reinforcing components at one or more predefined locations on a first mold by varying at least one of the spacing between mutually adjacent first reinforcing components and an orientation of one of the first reinforcing components of the plurality of first reinforcing components from a leading edge of the composite hollow blade to a trailing edge of the composite hollow blade, and
wherein the one or more predefined locations comprises at least one of a span-wise location from a hub to a tip of the composite hollow blade along the leading edge, a chord-wise location along the hub at the trailing edge of the composite hollow blade, a mid-plane location of the composite hollow blade, and a root location of the composite hollow blade.

6. The method of claim 1, wherein fabricating the grid core structure comprises wrapping or laying the plurality of first reinforcing components on a first mold to form one of a bi-grid core structure, a tri-grid core structure, or a hexagonal-grid core structure.

7. The method of claim 1, wherein forming the outer layer comprises:
stacking the plurality of second reinforcing components on a second mold to define a pressure side of the composite hollow blade; and
stacking the plurality of second reinforcing components on a third mold to define a suction side of the composite hollow blade.

8. The method of claim 1, wherein forming the outer layer comprises stacking the plurality of second reinforcing components on a second mold and a third mold such that the outer layer has a substantially uniform thickness on a pressure side and a suction side.

9. The method of claim 1, wherein forming the core comprises wrapping or laying the plurality of first reinforcing components on a first mold such that the grid core structure has a non-uniform thickness from a pressure side to a suction side.

10. A method of forming a composite hollow blade, comprising:
forming a core by wrapping or laying a plurality of first reinforcing components disposed in a first curable matrix material at one or more predefined locations on a first mold, based on a design parameter, to fabricate a grid core structure of the core,
wherein the design parameter is a width of one of the first reinforcing components of the plurality of first reinforcing components, spacing between mutually adjacent reinforcing components of the plurality of first reinforcing components, or an orientation of one of the first reinforcing components of the plurality of first reinforcing components; and
forming an outer layer comprising:
stacking a plurality of second reinforcing components disposed in a second curable matrix material on a second mold to define a pressure side of the composite hollow blade; and
stacking the plurality of second reinforcing components disposed in the second curable matrix material on a third mold to define a suction side of the composite hollow blade;
coupling the core to the outer layer; and
curing the core and the outer layer to form the composite hollow blade, the composite blade having a non-solid geometry that has at least a percentage of volume of the blade unoccupied; and
wherein the width of the first reinforcing components of the plurality of first reinforcing components is in a range from about 0.25 inch to about 1 inch, the spacing between mutually adjacent first reinforcing components is in a range from about 0.5 inch to about 2 inches, or both.

11. The method of claim 10, wherein forming the core comprises wrapping or laying the plurality of first reinforcing components on the first mold such that the grid core structure has a non-uniform thickness from a pressure side to a suction side.

12. The method of claim 10, wherein forming the core comprises selecting the design parameter such that the grid core structure sustains one of a frequency requirement, a foreign object damage requirement of the composite hollow blade, or a fan blade out requirement.

13. A composite hollow blade comprising:
a core comprising a composite grid core structure, wherein the composite grid core structure comprises a plurality of first reinforcing components and a first curable matrix material, and wherein the plurality of first reinforcing components is disposed at one or more predefined locations along the core based on a design parameter,
wherein the design parameter is a width of a first reinforcing component of the plurality of first reinforcing components, a spacing between mutually adjacent reinforcing components of the plurality of first reinforcing components, or an orientation of the first reinforcing component of the plurality of first reinforcing components defined by an angle with respect to a longitudinal axis of the composite hollow blade, and an outer layer comprising a plurality of second reinforcing components and a second curable matrix material, wherein the core is coupled to the outer layer;

wherein the composite blade is hollow such that the composite blade has a non-solid geometry that has at least a percentage of volume of the blade unoccupied; and wherein the width of the first reinforcing components of the plurality of first reinforcing components is in a range from about 0.25 inch to about 1 inch, the spacing between mutually adjacent first reinforcing components is in a range from about 0.5 inch to about 2 inches, or both.

14. The composite hollow blade of claim 13, wherein one of the reinforcing components of the plurality of first reinforcing components and one of the reinforcing components of the plurality of second reinforcing components comprise one or both of a carbon fiber and an s-glass fiber, and wherein the first curable matrix material and the second curable matrix material comprise a thermoset.

15. The composite hollow blade of claim 13, wherein the angle is in a range from about 15 degrees to about 150 degrees.

16. The composite hollow blade of claim 13, wherein the outer layer has a substantially uniform thickness on an outer layer pressure side and an outer layer suction side, and wherein the core has a non-uniform thickness from a core pressure side to a core suction side.

17. The composite hollow blade of claim 13, wherein the one or more predefined locations comprises at least one of a span-wise location from a hub to a tip of the composite hollow blade along a leading edge of the composite hollow blade, a chord-wise location along the hub at a trailing edge of the composite hollow blade, a mid-plane location of the composite hollow blade, and a root location of the composite hollow blade.

18. The composite hollow blade of claim 13, wherein the composite grid core structure comprises one of a bi-grid core structure, a tri-grid core structure, or a hexagonal-grid core structure.

19. The composite hollow blade of claim 13, wherein the design parameter is the spacing between the mutually adjacent reinforcing components of the plurality of first reinforcing component.

20. The composite hollow blade of claim 19, wherein one of the plurality of first reinforcing components is coupled to both the pressure side of the outer layer and the suction side of the outer layer.

* * * * *